Feb. 14, 1967   T. VREELAND, JR   3,303,572

DIAMETER GAUGE

Filed April 12, 1965

INVENTOR.
THAD VREELAND JR.
BY
Lyon+Lyon
ATTORNEYS

United States Patent Office 3,303,572
Patented Feb. 14, 1967

3,303,572
DIAMETER GAUGE
Thad Vreeland, Jr., Arcadia, Calif., assignor to California Institute Research Foundation, Pasadena, Calif., a corporation of California
Filed Apr. 12, 1965, Ser. No. 447,351
6 Claims. (Cl. 33—178)

This invention relates to diameter gauges and is a continuation-in-part of my copending application for Inside Diameter Gauge, Serial No. 140,322, filed September 25, 1961.

Included in the objects of this invention are:

First, to provide a diameter gauge which is particularly adapted for measuring the inside or outside diameter of an elongated tubular member at any selected point therein irrespective of the distance from an end of the tubular member or to provide a means for continuous measurement of an elongated tubular member throughout its length.

Second, to provide a diameter gauge wherein radial movement of feeler elements affects the electrical properties of a strain gauge bridge to vary an electrical signal calibrated in terms of diametrical measurements.

Third, to provide a diameter gauge which is not only capable of extremely accurate measurement but is also, inherently, particularly rugged.

With the above and other objects in view as may appear hereinafter, reference is directed to the accompanying drawings in which.

Figure 1:
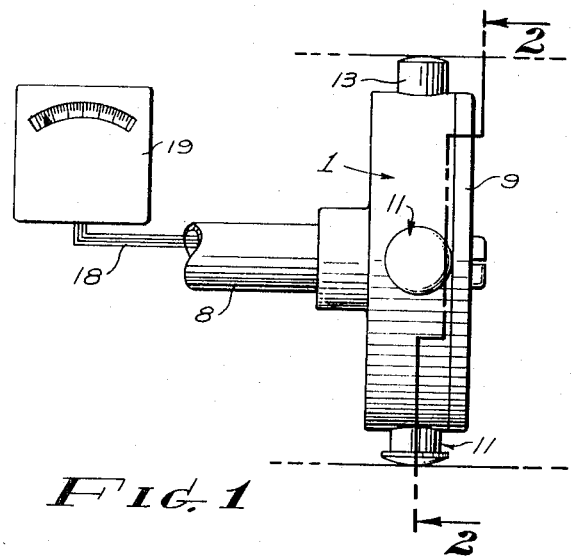
FIGURE 1 is a side view of the diameter gauge as adapted for inside measurement and showing diagrammatically the electric circuit connected therewith.
Figure 2:
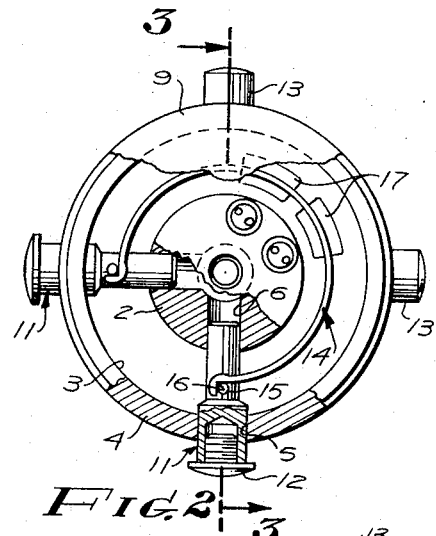
FIGURE 2 is a partial end, partial side view thereof taken through 2—2 of FIGURE 1.

Reference is first directed to FIGURES 1 through 4 wherein the gauge is adapted for measurement of the inside of a tubing. The gauge includes a cylindrical housing 1 of short extent having a central core 2 therein so as to form an annular chamber 3. The radially outer wall 4 of the chamber is provided with two radial guide openings 5 located at 90° to each other and in alignment with guide bores 6 formed in the boss 2.

The boss is provided with an axial bore 7 extending in the opposite direction from the annular chamber 3. The outer end of the bore 7 is screw threaded or otherwise equipped to a handle tube 8.

The open end of the chamber 3 is covered with a cover 9 which fits over the outer wall 4 and the central boss 2 and may be held in place by a central screw 10.

The radially aligned guide openings 5 and guide bores 6 receive movable probes 11 in the form of rods which bridge the annular chamber. The axially outer ends of the movable probes project beyond the housing and are enlarged and provided with screw threaded sockets to receive interchangeable tips 12. Located diametrically opposite each movable probe is a fixed probe 13 which is screw threaded into the annular wall 4.

Fitted within the annular chamber 3 is a spring member 14 occupying approximately three-fourths of a circle. The ends of the spring member are divided to straddle the bridging portions of the movable probes 11. As clearly shown in the drawing, the spring member 29 is supported in such a manner that it does not contact either the core 2 or the inner wall 4 of the housing. The movable probes are provided with cross pins 15 which bear in V-grooves 16 formed adjacent the ends of the spring member 14.

Cemented or otherwise secured to the central portion of the spring member is a set of conventional strain gauge elements 17. The strain gauge elements are connected by electrical conductors 18 extending through the handle tube 8 to a suitable indicating or recording device 19 capable of measuring in a conventional manner electrical changes in response to operation of the strain gauge elements as the spring member is altered in radius. The indicating device is graduated to designate diametrical distances.

Operation of the inside diameter gauge is as follows:

By selection of the appropriate movable probe tips 12 and fixed probes 13, the inside diameter gauge may be adjusted to various ranges of bore diameters. As the bore diameter changes within the range of the gauge, the spring member 14 is expanded or contracted in diameter and the attendant strain is sensed by the strain gauge elements 17. The strain is translated into indication of diametrical measurement by appropriate selection of the scale forming a part of the indicating device 19.

It should be noted that the use of probes separated by 90° permits the averaging of two corresponding diameters in a single reading. This is so because the spring member is affixed only to the movable probes and its change in radius is in response to the combined motions of the two probes.

Figure 5:
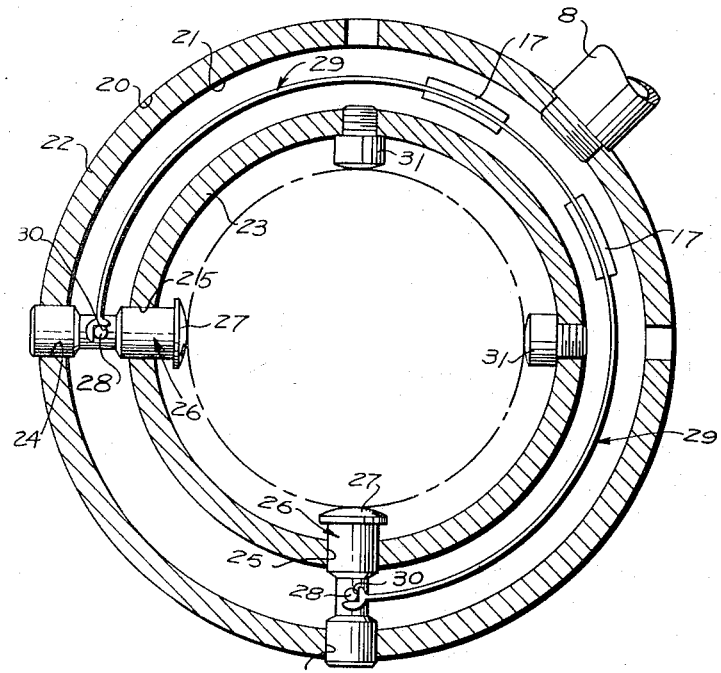
FIGURE 5 is a sectional view corresponding to FIGURE 2 showing the gauge adapted for outside measurement.
Figure 3:
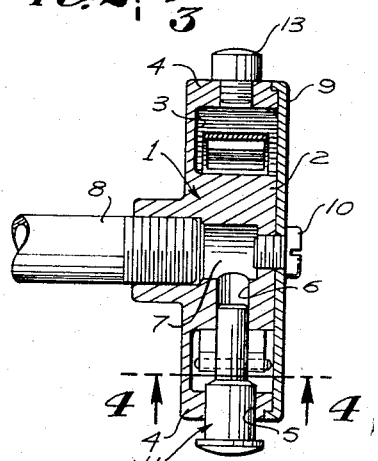
FIGURE 3 is a transverse, sectional view thereof taken through 3—3 of FIGURE 2.
Figure 4:
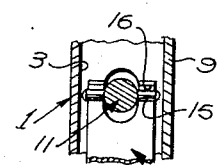
FIGURE 4 is a fragmentary section view thereof taken through 4—4 of FIGURE 3.

Reference is now directed to FIGURE 5 which illustrates a modification of the gauge adapted to measure the outside diameter of a tube or rod.

In this case, an annular housing 20 having an annular chamber 21 formed between radially outer and radially inner walls 22 and 23. A suitable cover, not shown, is provided for the chamber. The walls of the chamber are provided with two pair of radially aligned guide openings 24 and 25 disposed in 90° relation which receive radially movable probes 26 corresponding to the movable probes 11. The radially inner ends of the probes are provided with tube engaging heads 27.

The mid portions of the movable probes 26 are reduced in diameter and provided with transverse pins 28. A spring member 29 corresponding to the spring member 14 occupies approximately three-fourths of the chamber 21. The ends of the spring member 29 are split to straddle the movable probes 26 and are provided with V-grooves 30 oriented to bear against the pins 28. The spring member 29 is provided with strain gauge elements 17 which are connected, as in the first described structure to a suitable indicating or recording device 19.

Disposed at 90° to each other and to said movable probes 26 are radially directed fixed probes 31 corresponding to the fixed probes 13.

Operation of the modified diameter gauge is essentially the same as the first described structure.

Having thus described certain embodiments of my invention, I do not desire to be limited thereto, but desire to include in the scope of my invention all novelty inherent in the appended claims.

What is claimed is:

1. A diameter gauge, comprising:
  (a) a housing having at least one radial guide bore and an annular chamber intersecting the guide bore;
  (b) a radially movable probe element mounted in said guide bore and bridging said chamber and having a sensing end;
  (c) a curved spring strip fitted within said annular chamber and having a free end engaging said movable probe element to urge said probe element radially, whereby said spring strip flexes in correspondence to radial positions of said probe element;

(d) electrical strain gauge means mounted on said spring strip to sense flexed conditions thereof;
(e) and an electrical circuit utilizing said strain gauge means for translating the flexed conditions of said spring strip into diametrical measurements.

2. A diameter gauge according to claim 1 wherein:
(a) said gauge is an inside diameter gauge and the radially outer end of said probe is the sensing end thereof.

3. A diameter gauge according to claim 1 wherein:
(a) said gauge is an outside diameter gauge and the radially inner end of said probe is the sensing end thereof.

4. A diameter gauge comprising:
(a) a cylindrical housing having an annular chamber therein to form annular radially outer and radially inner walls and a pair of arcuately displaced radially aligned sets of guide openings in said walls;
(b) a pair of radially movable probes slidable in said sets of guide openings and bridging said annular chamber, each of said movable probes having a head at one end for engagement with a circular member;
(c) at least one fixed probe carried by said housing for engagement with said circular member;
(d) an arcuate spring freely fitting said annular chamber and having ends engaging the bridging portions of movable probes to urge said movable probes radially;
(e) electrical strain gauge means mounted on said spring to sense flexed conditions thereof;
(f) and an electrical circuit utilizing said strain gauge means for translating the flexed conditions of said spring into diametrical measurements of said circular member.

5. A diameter gauge as set forth in claim 4, wherein:
(a) said gauge is an inside diameter measuring gauge and said heads engage the inside surface of a circular tubular member.

6. A diameter gauge as set forth in claim 4, wherein:
(a) said gauge is an outside diameter measuring gauge and said heads engage the outside surface of a circular member.

References Cited by the Examiner

UNITED STATES PATENTS

| | | | |
|---|---|---|---|
| 2,495,797 | 1/1950 | Whitlock et al. | 33—178 |
| 2,677,190 | 5/1954 | Shaw et al. | 33—178 |

FOREIGN PATENTS 1,232,835   4/1960   France.

LEONARD FORMAN, *Primary Examiner.*
S. S. MATTHEWS, *Assistant Examiner.*